Aug. 7, 1923.
G. R. FOLDS
PROTECTIVE DEVICE
Filed March 19, 1920
1,463,945
2 Sheets-Sheet 1
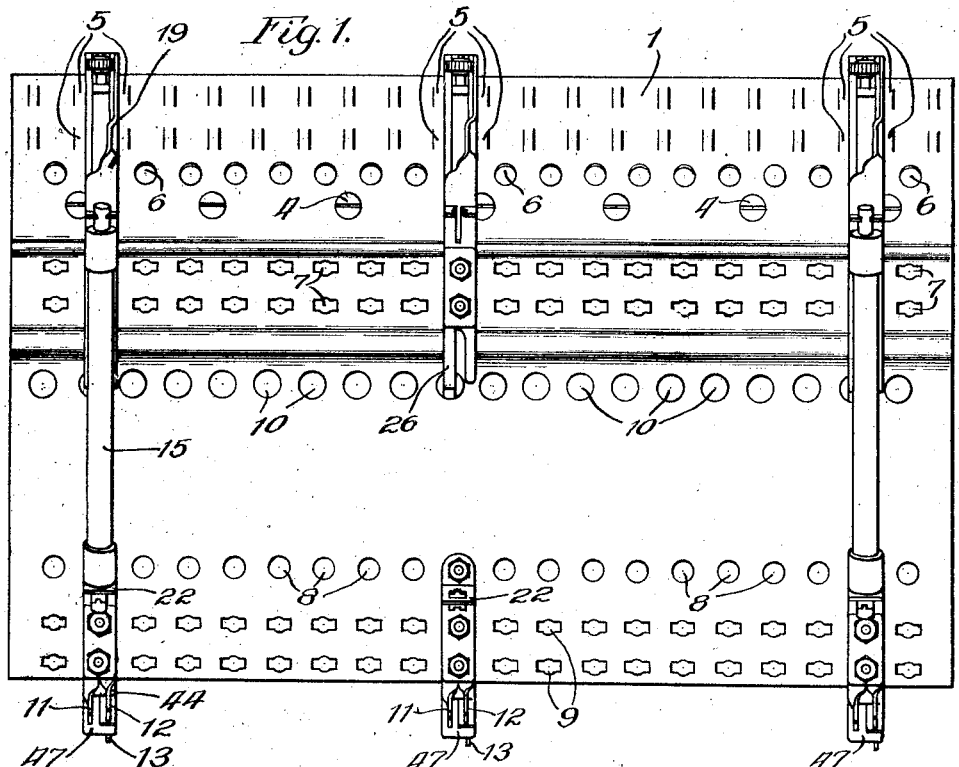
Fig. 1.
Fig. 5. Fig. 6.
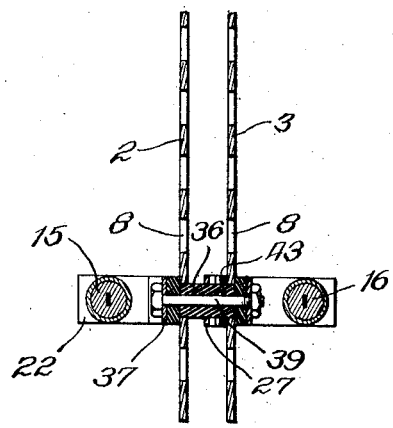
Inventor:
George R. Folds
By:
Jones, Addington, Ames & Seibold Attys.

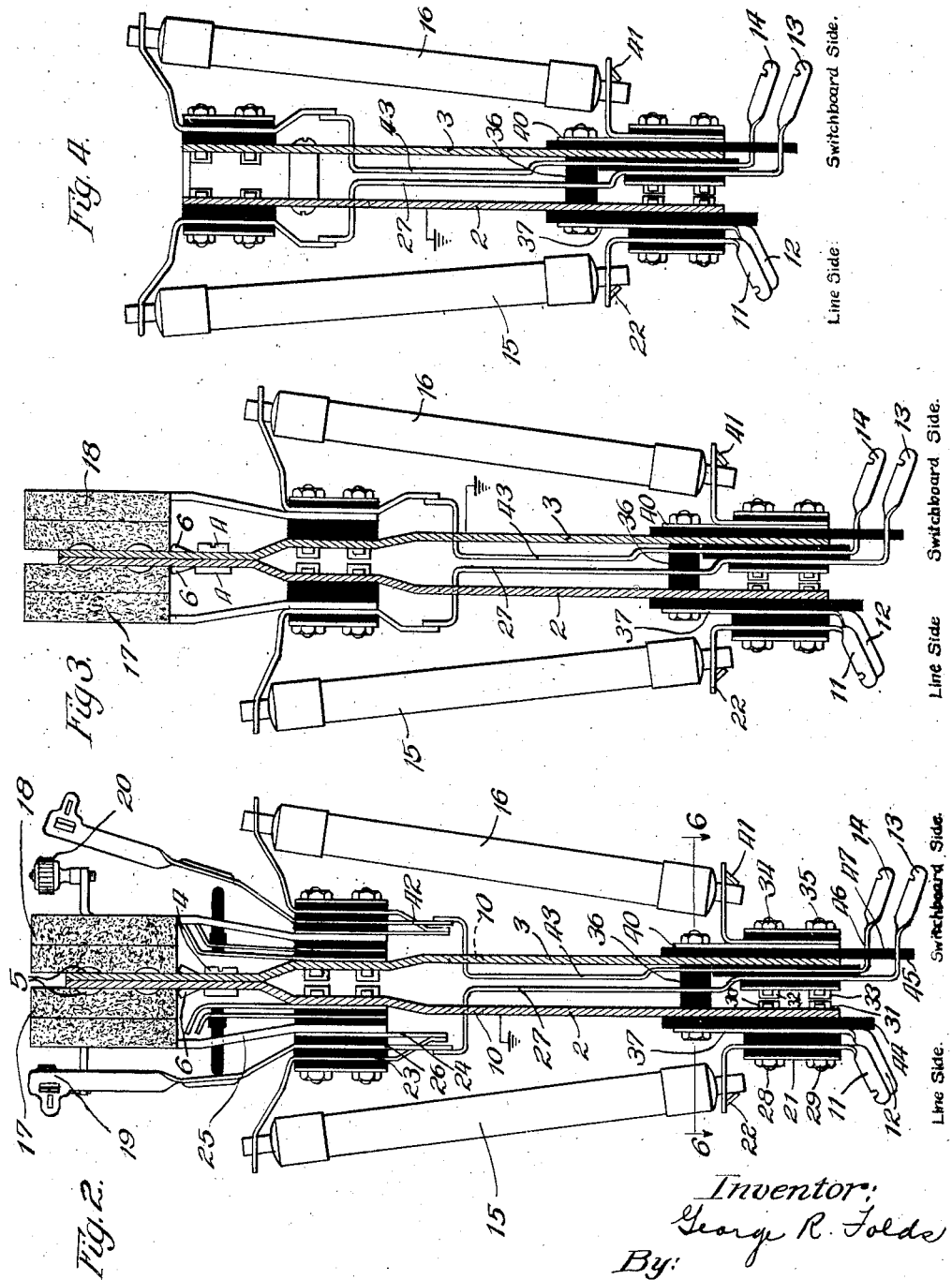

Patented Aug. 7, 1923.

1,463,945

UNITED STATES PATENT OFFICE.

GEORGE R. FOLDS, OF EVANSTON, ILLINOIS, ASSIGNOR TO COOK ELECTRIC COMPANY, OF CHICAGO, ILLINOIS, A CORPORATION OF ILLINOIS.

PROTECTIVE DEVICE.

Application filed March 19, 1920. Serial No. 367,192.

*To all whom it may concern:*

Be it known that I, GEORGE R. FOLDS, a citizen of the United States, residing at Evanston, in the county of Cook and State of Illinois, have invented new and useful Improvements in Protective Devices, of which the following is a full, clear, concise, and exact description, reference being had to the accompanying drawing, forming a part of this specification.

My invention relates to protective devices for telephone and telegraphic circuits, and it has particular relation to devices comprising fuses, lighting arresters, and heating coils, or any one of them, so arranged in combination that the device in its entirety may be mounted upon a panel, such a panel accommodating as many of said devices as may be desired.

For a better understanding of my invention reference may be had to the accompanying drawings, in which:

Fig. 1 is an elevational side view of a plurality of protective devices, embodying my invention, mounted upon a panel, the panel being adapted for disposition on a telephone distributing frame;

Figs. 2, 3 and 4 are elevational views of a device embodying my invention;

Fig. 5 is a fragmentary view of the other side of the panel shown in Fig. 1 and illustrates the positioning of the terminals on the other side of the board from that shown in the latter figure; and Fig. 6 is a plan sectional view taken on the line 6—6 of Fig. 2.

Protective devices of the character designated usually comprise two line terminals from which circuits embodying protective apparatus lead to switchboard terminals, the two sets of terminals usually being positioned on opposite sides of a mounting panel. A number of the protective devices are disposed on each mounting panel and a plurality of the mounting panels are secured to a distributing frame. In this manner all of the incoming subscribers' lines are carried to one side of the mounting panel and are thereby easily accessible whereas the switchboard leads are secured to terminals on the opposite sides of the mounting panel, these latter terminals being known as switchboard terminals.

For purposes of convenience and accessibility protective means are embodied in each of the two circuits which are associated with each device, the protective devices for one circuit being positioned on one side of the mounting panel, and the other set of protective devices for another circuit being positioned on the opposite side of said panel.

With the above in mind, it is apparent that, in order to have both of the line terminals on one side of the panel, and both of the switchboard terminals on the other side of the panel and, at the same time, carry the circuits therebetween through protective devices situated on opposite sides of the panel, the line side circuits and the switchboard line circuits must cross each other. Moreover, it must be remembered that all of the apparatus and the circuits are confined to a comparatively small space. The mounting panel usually constitutes a grounded member, all of said panels being so secured to the distributing frame that the apparatus positioned thereon may be grounded when desired.

In the past, in connection with devices of the character above described, the switchboard circuits have been carried on the grounded panel alongside of the line terminals and conductors, and were, therefore, in dangerous electrical proximity to the latter. Moreover, the crossing point of the two circuits, above referred to, was usually just at the end of the mounting panel where the terminals protruded there-beyond. Both of the above features operated to decrease the factor of safety, and especially was this true because of the small space available for the mounting of the circuits, and the consequent proximity of the line terminals and switchboard terminals.

One object of my invention is to provide a protective device comprising, as a portion thereof, a grounded mounting panel, and wherein the switchboard and line circuits are carried across one another without their being in dangerous electrical proximity. In the furtherance of this object I also provide means whereby the switchboard circuits leaving the protective devices are carried between grounded barriers, thus greatly enhancing the safety characteristics of the protective device inasmuch as no portion of the switchboard circuits is electrically closer to the line circuits than the latter are to the grounded panel, whereby any disruptive discharge inevitably goes to the grounded panel, and the danger attending the same is thereby eliminated.

As will hereinafter be more fully described, I accomplish the above objects by employing a grounded panel comprising two separated plates between which the switchboard circuits are carried. Furthermore, when I hereinafter refer to line circuits it will be understood that I mean the circuits extending from the line terminals to whatever protective devices are employed and, furthermore, that those circuits designated as switchboard circuits comprise the conductors leading from the protective devices to the switchboard terminals. With this distinction in mind, the hereinafter description discloses improved means for carrying one of the circuits across the other circuit without their being positioned in dangerous electrical proximity.

An incidental result of my invention is the extreme simplicity of the terminal arrangement whereby the circuits, an apparatus, for each of them, are easily identified and accessible for the purpose of repair.

In the hereinafter description, for the purpose of illustration, many features are discussed which have been more specifically described and claimed in the co-pending application of Roy G. Sands, Serial No. 300,435, filed May 28, 1919, and assigned to Frank B. Cook Company, and reference should be made thereto for a fuller understanding of such features as will hereinafter be identified therewith, these features forming no part of the present invention but their description herein being essential for a complete understanding of my improved protective device.

Referring now more particularly to the accompanying drawings, a mounting plate 1, comprising two diverging plates 2 and 3 fastened together by appropriate bolts 4, is shown. Portions of the plates 2 and 3 are up-set to constitute raised lugs 5 and 6. The plates are also provided with screw-holes 7, 8 and 9 and apertures 10.

Referring now to Fig. 2, in connection with Fig. 1, a protective device comprises line terminals 11 and 12 and switchboard terminals 13 and 14, one circuit extending between the terminals 11 and 13 and another circuit extending between the terminals 12 and 14. Positioned between the two terminals and in each circuit, are protective devices comprising fuses 15 and 16, lighting arrester-blocks 17 and 18, and heating coils 19 and 20. The heating coil 20 is shown after having operated to ground the circuit associated therewith, whereas the coil 19 is shown in its normal position. For further details regarding the construction of this portion of the protective device, reference should be had to the above identified co-pending application.

In the ensuing description and claims I have frequently employed the terms "top," "bottom," "upwardly," "downwardly," etc. when referring to the various portions of the protective device, and the circuits thereof. I wish it to be distinctly understood, however, that such terms are used only in an illustrative sense and are definite only in connection with the manner in which the figures are positioned on the drawing. In actual practice and installation, these terms are not, of course, accurate, inasmuch as the devices and the mounting panel occupy different positions from those shown in the drawings.

Beginning now with the line terminal 11, the circuit therefrom may be traced through a strip conductor provided with an L shaped portion 22, having therein a clip to accommodate one end of the fuse 15. From the other end of the fuse 15 the circuit leads through another strip conductor 23 which is soldered at its lower end to a conductor 24, the last named conductor being in electrical contact with another conducting member 25 which operates to hold the carbon blocks 17 against the plate 2 and between the lugs 5 and 6. Thence the circuit passes through the heating coil 19 and downwardly along a strip conductor 26, the latter being attached electrically to what may be termed a switchboard circuit 27 terminating at the switchboard terminal 13. It will be observed that the circuit or conductor 27 passes through one of the apertures 10 and extends downwardly between the two plates 2 and 3.

Appropriate insulating blocks are interposed between the various circuits which I have described, but they will not, in order to promote the simplicity to the illustration, be identified by reference numerals. It will be observed, however, that at the bottom portion of the device, or at the edges of the diverging plates, bolts 28 and 29 have attached to their inner ends small lugs 30 and 31, respectively, and that adapted to abut thereagainst are lugs 32 and 33 attached to the inner ends of bolts 34 and 35. This particular construction is of advantage in that it secures the requisite number of insulating blocks between the desired strip conductors and at the same time provides means whereby the plates 2 and 3 are restrained in a separated position.

Referring now to the circuit extending from the other line terminal 12, it is apparent that, if protective devices are to be situated between this terminal and the terminal 14, and moreover, if said protective devices are to be positioned upon the other side of the grounded panel 1, the circuit leading from the terminal 12 must cross to the other side of the mounting panel, where it can be led through the required protective devices and thereafter come to the proper switchboard terminal 14.

As above pointed out, in all of the former devices of this character, so far as I am aware, the two circuits crossed at the bottom of the mounting panel, and in dangerous electrical proximity to each other and, moveover, the line and switchboard circuits were carried side by side along both sides of said panel.

I eliminate the difficulties and danger incident to this former practice by carrying the circuit starting at the line terminal 12 through an insulating bushing, which extends from the outer side of the plate 2 to the outer side of the plate 3. The specific construction of a bushing 36 of this character may be understood by reference to the sectional view of Fig. 6 taken in connection with the showing of Fig. 2. As illustrated in these figures, the circuit from 12 is carried upwardly on a conducting strip 37 which terminates at one end of the bushing 36 and is electrically carried through the bushing 36 by a bolt 39, the latter also serving to secure the plates 2 and 3 in the desired relation. At the outer side of the plate 3 the circuit is carried downwardly through a strip 40 which is in electrical contact with another strip having a fuse clip portion 41. The circuit under consideration is then carried upwardly through the fuse 16 and, in an analogous manner to the heretofore described circuit upon the other side of the mounting panel, passes through the carbon blocks 18, and the heat coil 20. At the bottom end 42 of the heat coil spring, is soldered a strip conductor 43 having a Z portion at the upper end thereof whereby it may pass through an aperture 10 in the plate 3 and thence downwardly to the switchboard terminal 14.

The line terminals 11 and 12 are secured to an insulating slab 44, whereas the switchboard terminals 13 and 14 are positioned in slots 45 and 46, respectively, of an insulating block 47. It will be observed that, by this particular positioning of insulating sheets, additional protective barriers are established between the line terminals and the switchboard terminals. For purposes of convenience I have designated the terminals 11 and 12 as the "line side" and the terminals 13 and 14 as the "switchboard side," this being terminology by which they are designated in the intelligence transmission art.

Figs. 3 and 4 illustrate the manner in which my invention may be utilized with devices having a less number of protective elements. In Fig. 3 the heat coils 19 and 20 are omitted, while in Fig. 4 only the fuses 15 and 16 are employed. It will, of course, not be necessary in the two latter figures to trace the circuits through the various protective elements. It will be observed, however, that the essential elements of my invention, namely, the non-crossing of the two circuits in dangerous electrical proximity, and the substantial enclosure of the switch-board circuits within a grounded container such as is formed by the two spaced grounded plates 2 and 3, are embodied therein.

With the construction above described, I find that should a high potential be impressed on one of the line terminals there is little or no danger of it reaching the switchboard terminals, inasmuch as the switchboard circuits are at no point in close proximity to the line circuits in fact the former circuits are, at all points, much closer to the grounded plates than to the latter circuits. Therefore, if there should be a tendency for a discharge between the two terminals on opposite sides of the panel the discharge will be directly to the grounded plate.

It will be apparent to those skilled in the art that this feature ensures distinct advantages and eliminates a great deal of the trouble which was inherent in the old construction, heretofore described. Moreover, it will be observed that I have eliminated the crossing of the two circuits at the point where the terminals protrude from the mounting panel. The construction shown is also advantageous in that the complete separation of the line and switchboard terminals, without a confusing crossing of the circuits therebetween, makes the identification of the various circuits and terminals easy, and greatly facilitates the installation and repair of connections.

While I have described several embodiments of my invention, it is apparent that many modifications therein may occur to those skilled in the art, but inasmuch as I am the first, so far as I am aware, to provide in a device of the character described, lines circuits and switchboard circuits which do not cross in dangerous electrical proximity, and furthermore, to so associate the switchboard circuits with a grounded mounting panel between, that they are substantially enclosed therein, I desire that therefore, my invention be accorded a broad range of equivalents, and that it be limited only by the showing of the prior art or by the scope of the appended claims.

Having thus described my invention, what I claim to be new and desire to obtain by Letters Patent is:

1. In a device of the character described, line terminals and switchboard terminals, circuits there-between embodying protective apparatus, and a panel comprising spaced walls, the circuits from said protective ap-

and line terminals on the other side thereof, circuits extending therebetween, protective devices for said circuits mounted on both sides of said panel, and a conduit extending through said plates, one circuit extending from one of said line terminals through the protective devices on one side of said panel and then between said plates to one of said switchboard terminals, and another circuit extending from another line terminal through said conduit to the other side of said panel, through the protective devices on said last panel side, and between said plates to another switchboard terminal.

In witness whereof, I have hereunto subscribed my name.

GEORGE R. FOLDS.

Witnesses:
J. C. BOGLE,
R. GRAWOIG.